US009495480B2

(12) United States Patent
White et al.

(10) Patent No.: US 9,495,480 B2
(45) Date of Patent: Nov. 15, 2016

(54) COMPACT FOCUSED SEARCH INTERFACE

(75) Inventors: Brent-Kaan William White, San Francisco, CA (US); Sherry Mead, San Francisco, CA (US); Ritchard Shadian, San Mateo, CA (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 1211 days.

(21) Appl. No.: 11/857,242

(22) Filed: Sep. 18, 2007

(65) Prior Publication Data

US 2009/0077029 A1 Mar. 19, 2009

(51) Int. Cl.
*H04N 1/00* (2006.01)
*G06F 17/30* (2006.01)
*G06F 3/0483* (2013.01)

(52) U.S. Cl.
CPC ....... *G06F 17/30973* (2013.01); *G06F 3/0483* (2013.01); *G06F 17/30398* (2013.01)

(58) Field of Classification Search
CPC .............. G06F 17/3005; G06F 17/30112; G06F 2203/04803; H04N 1/00432
USPC ................. 715/968, 764, 777, 766
See application file for complete search history.

(56) References Cited

U.S. PATENT DOCUMENTS

| | | | | |
|---|---|---|---|---|
| 7,289,967 | B1* | 10/2007 | Brader-Araje et al. | 705/26.3 |
| 7,765,225 | B2* | 7/2010 | Robert | G06F 17/3064 707/765 |
| 2004/0002959 | A1* | 1/2004 | Alpert et al. | 707/3 |
| 2006/0036567 | A1* | 2/2006 | Tan | 707/1 |
| 2006/0282427 | A1* | 12/2006 | Shurtleff et al. | 707/5 |
| 2007/0168335 | A1* | 7/2007 | Moore et al. | 707/3 |
| 2008/0065237 | A1* | 3/2008 | Long | G06F 17/30864 700/3 |
| 2009/0077055 | A1* | 3/2009 | Dillon | G06F 17/30702 |
| 2010/0185979 | A1* | 7/2010 | Shores | G06F 3/0481 715/809 |

* cited by examiner

*Primary Examiner* — Shen Shiau
(74) *Attorney, Agent, or Firm* — Precision IP (57) ABSTRACT

A graphical user interface for searching information related to business objects includes a search interface having one or more user input fields for receiving data from a user related to one or more attributes associated with business objects. The search interface presents the one or more user input fields in response to a user context. A first tab displays information related to a set of business objects in response to a search based on the data provided to the one or more user input fields. A second tab displays information related to a business object in the set of business objects.

15 Claims, 6 Drawing Sheets

COMPACT FOCUSED SEARCH INTERFACE

BACKGROUND OF THE INVENTION

The present invention relates to information systems. More specifically, the present invention relates to techniques for a compact focused search interface for searching business objects.

In general, current application suites limit searching to a serial operation where users must focus on one step at a time. This tunnel view implementation of search generally results in problems when searching on multiple fields. The presentation of the search interface is usually a page full of input fields, which clutter the search interface and may rarely be used by a user for typical day-to-day tasks.

By using these type of search interfaces, a user simply cannot perform a search while completing another task. Thus, users interact with application search interfaces like a mode. For example, a user is required to switch from a task oriented or working mode to a search mode. The search mode switches then to a review mode to review the results of the search. Then, the user returns to a task oriented or working mode after reviewing the results of the search.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to information systems. More specifically, the present invention relates to techniques for a compact focused search interface for searching business objects.

In various embodiments, a graphical user interface on a computer system is provided for searching information related to business objects. The graphical user interface includes a search interface having one or more user input fields for receiving data from a user related to one or more attributes associated with business objects. The search interface presents the one or more user input fields in response to a user context. A first tab displays information related to a set of business objects in response to a search based on the data provided to the one or more user input fields and a context associated with the search interface. A second tab displays information related to a business object in the set of business objects.

In some embodiments, one or more tasks performed by a user interacting with the graphical user interface define the user context. The graphical user interface may further include a working area that includes the search interface, the first tab, and the second tab. The first tab may be displayable with the search interface in response to a search request from the user with the search interface. The second tab may be displayable with the search interface and the first tab in response to selection of the business object in the set of business objects displayed in the first tab.

In further embodiments, a computer program product is stored on a computer readable medium for generating a graphical user interface for searching information related to business objects. The computer program product includes code for generating a search interface having one or more user input fields for receiving data from a user related to one or more attributes associated with business objects, the search interface configured to present the one or more user input fields in response to a user context, code for generating a first tab configured to display information related to a set of business objects in response to a search based on the data provided to the one or more user input fields, and code for generating a second tab configured to display information related to a business object in the set of business objects.

In one embodiment, a system for generating a graphical user interface for searching information related to business objects includes a processor and a memory. The memory is coupled to the processor, and configured to store a set of instructions which when executed by the processor cause the processor to display a search interface having one or more user input fields for receiving data from a user related to one or more attributes associated with business objects, the search interface configured to present the one or more user input fields in response to a user context, display a first tab using the display device, the first tab configured to display information related to a set of business objects based on the data provided to the one or more user input fields, and display a second tab using the display device, the second tab configured to display information related to a business object in the set of business objects.

In various embodiments, a method for retrieving information includes providing a compact search interface in a working area of a graphical user interface, the compact search interface configured to present one or more user input fields in response to a user context. Input is received from a user interacting with the search interface. The input from the user is indicative of a set of search terms. Information related to a set of business objects is determined based on the set of search terms. The information related to the set of business objects is displayed in a first tab in the working area associated with the graphical user interface.

In some embodiments, the user context may be defined by one of a plurality of tasks. Further, the set of search terms may be stored as a stored search. The stored search may be retrieved or received, and subsequently executed.

In one embodiment, the set of search results are displayed in the first tab. Information related to a business object in the set of results is displayed in a second tab in the working area. The method may include switching between the first tab and the second tab in the working area.

In still further embodiments, a computer program product is stored on a computer readable medium for retrieving information. The computer program product includes code for providing a compact search interface in a working area of a graphical user interface, the compact search interface configured to present one or more user input fields in response to a user context, code for receiving input from a user interacting with the search interface, the input from the user indicative of a set of search terms, code for determining information related to a set of business objects based on the set of search terms, and code for displaying the information related to the set of business objects in a first tab in the working area associated with the graphical user interface.

In one embodiment, a system for retrieving information includes a processor and a memory coupled to the processor. The memory stores a set of instructions which when executed by the processor cause the processor to provide a compact search interface in a working area of a graphical user interface, the compact search interface configured to present one or more user input fields in response to a user context, receive input from a user interacting with the search interface, the input from the user indicative of a set of search terms, determine information related to a set of business objects based on the set of search terms, and display the information related to the set of business objects in a first tab in the working area associated with the graphical user interface.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

The present invention relates to information systems. More specifically, the present invention relates to techniques for a compact focused search interface for searching business objects.

In general, a compact transactional (or focused) search interface addresses interfaces where search is not necessarily the primary user action. This allows for a more integrated work environment for end users who don't have to lose context of their task focus when conducting a search. For instance, if a user is trying to complete a task and realizes that search is required, the current way to prevent a user from losing information that is being entered would be to spawn a new browser window, conduct a search, find information, and then return to the original task.

The compact search interface also supports advanced search functionalities, such as conditional search and saved searches within a compact splitter pane. Thus, the user of the compact search interface does not have to choose a mode of work. For example, enterprise search interfaces currently have a search mode where the entire page is dedicated to search, or where the user is completing a task. However, with the compact transactional search, the user can complete tasks and search within the same interface.

Figure 1:
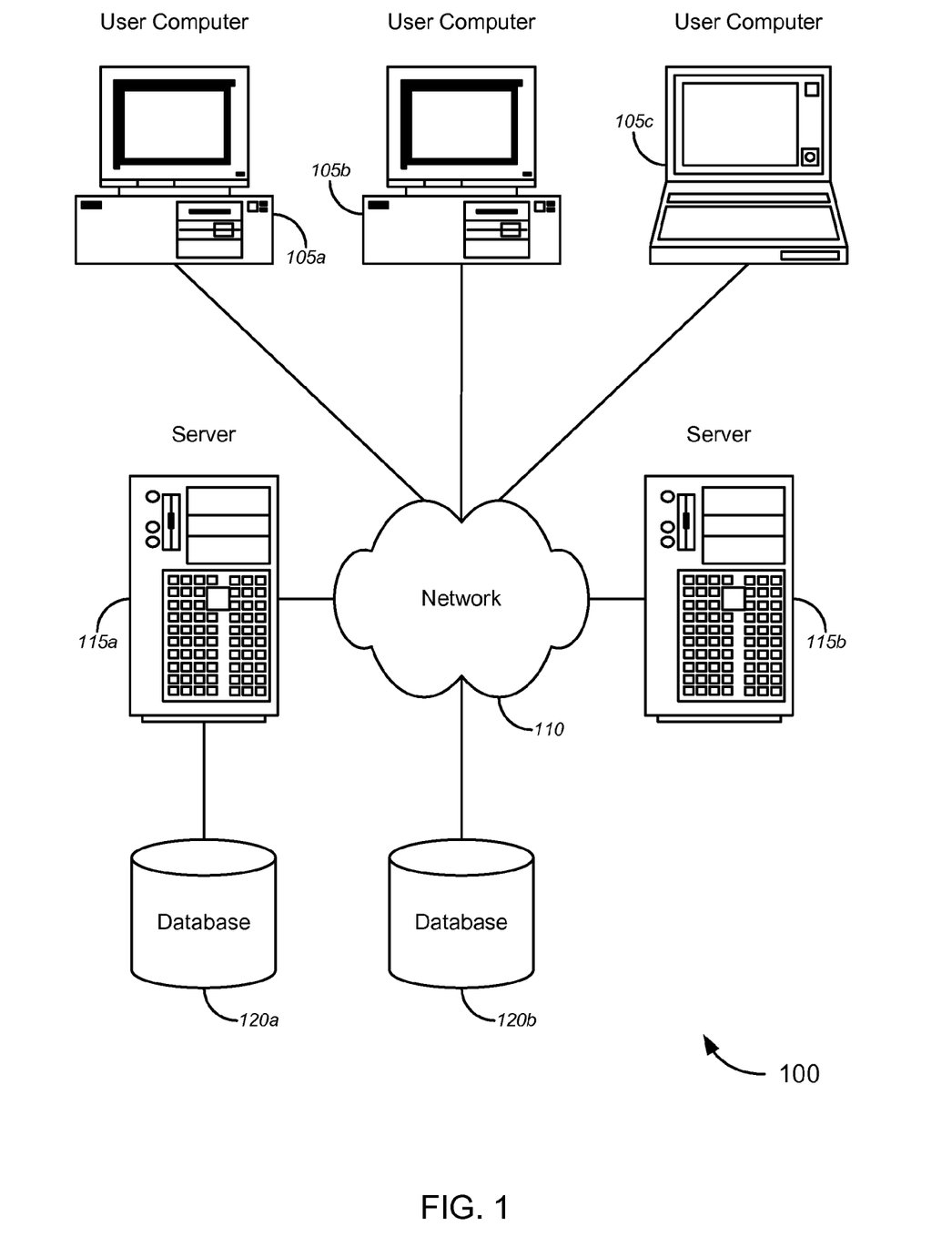
FIG. 1 is a simplified block diagram of a system that may incorporate an embodiment of the present invention.

FIG. 1 is a simplified illustration of a system 100 that may incorporate an embodiment of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105a, 105b, and 105c). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., network 110 described below) and/or displaying and navigating web pages or other types of electronic documents. Although the exemplary system 100 is shown with three user computers, any number of user computers can be supported.

Certain embodiments of the invention operate in a networked environment, which can include a network 110. Network 110 can be any type of network familiar to those skilled in the art that can support data communications using any of a variety of commercially-available protocols, including without limitation TCP/IP, SNA, IPX, AppleTalk, and the like. Merely by way of example, network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115a and 115b). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one or more file and/or application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to a user computer 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on a user computer 105 and/or another server 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120a and 120b). The location of the database(s) 120 is discretionary: merely by way of example, a database 120a might reside on a storage medium local to (and/or resident in) server computer 115a (and/or one or more of user computers 105). Alternatively, a database 120b can be remote from any or all of user computers 105 and server computers 115, so long as it can be in communication (e.g., via network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle database, that is adapted to store, update, and retrieve data in response to SQL-formatted commands. Databases 120 might be controlled and/or maintained by a database server, as described above, for example.

Accordingly, system 100 provides objects a compact transactional (or focused) search interface that also supports advanced search functionalities, such as conditional search and saved searches within a compact splitter pane. Thus, the user of the compact search interface does not have to choose a mode of work, and can complete tasks and search within the same interface.

Figure 2:
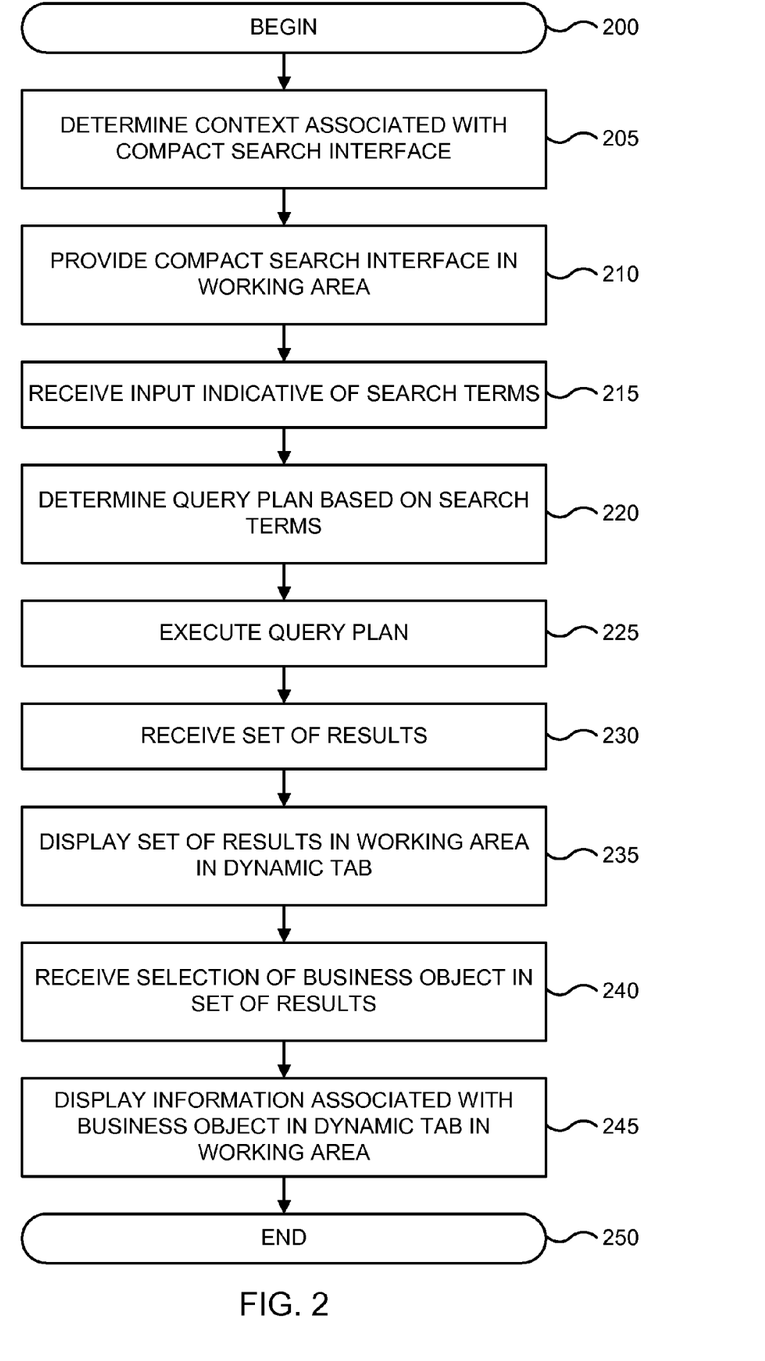
FIG. 2 is a flowchart of a method for searching for information related to business objects in one embodiment according to the present invention.

FIG. 2 is a flowchart of a method for searching for information related to business objects in one embodiment according to the present invention. The processing depicted in FIG. 2 may be performed by software modules (e.g., instructions or code) executed by a processor of a computer system, by hardware modules of the computer system, or combinations thereof. FIG. 2 begins in step 200.

In step 205, a context associated with a compact search interface is determined. The context specifies a subset of the attributes associated with business objects that are to be displayed within the compact search interface. In other words, the context identifies which of a plurality of user input fields that are to be presented on the compact search interface. The context (e.g., the subset of attributes) associated with the compact search interface may change based on the type of work or task that a user is performing with an application. In some embodiments, the context may be a default context. The default context may be updated or changed whenever any user selects a new task or performs a new operation or changes in mode of working.

In step 210, the compact search interface is provided in a working area of the graphical user interface. In general, a compact search interface (or compact focused search interface) is any interface that includes one or more user input fields, such as text boxes or checkboxes, for searching information related to a business object. The search interface is compact because only a subset of all of the attributes associated with business objects are presented as the one or more input fields. Some examples of attributes associated with business objects are names, identifiers, dates, address information, properties, methods, and the like.

In step 215, input indicative of one or more search terms is received. For example, a user may input data related to the subset of attributes presented by the one or more user input fields of the compact search interface. The one or more search terms may include attributes, criteria, natural language, structured language, wildcards, Boolean operators, conditional qualifiers for field types ("greater than" or "less than" for numbers; "starts with", "contains", "ends with" for text fields, etc.), and the like.

In step 220, a query plan is determined based on the one or more search terms. Thus, the user need not be presented with a full page of attributes for which to search for business objects. The compact search interface allows a query plan to be constructed based on predetermined or pre-supplied attributes (presented to the user as the user input fields). The predetermined or pre-supplied attributes may be obtained based on the user context, such as the type of task or task being performed by the user in a working area displayed on a graphical user interface.

In step 225, the query plan is executed. For example, one or more queries may be generated and executed against a database (e.g., FIG. 1). In step 230, a set of results are received in response to execution of the query plan. In step 235, the set of results are displayed in the working area. For example, the set of results may be displayed in a dynamic tab. A dynamic tab is any tab that is displayed in the working area along with the compact search interface. Thus, the user does not have to change the mode that the user is working on, but can perform a search, and receive the results of the search on a tab which may or may not replace the working area of the user.

In one example, a user may be interacting with information associated with a business object in a main working area of a graphical user interface. The compact search interface may be embedded within the main working area, such as to the right or to the left of where the information associated with the business object is displayed in a graphical user interface. The user may then perform a search using the compact search interface without changing the mode of working with the information, and the results of the search may be displayed in a dynamic tab. A representation of the dynamic tab, such as an icon or tab header, is displayed in the main working area. The user then can select the icon or tab header and switch to the set of search results. Additionally, the user can select a business object in the center results, and have information related to that selected business object displayed in a dynamic tab.

Thus, referring again to FIG. 2, in step 240, a selection is received of a business object in a set of results. In step 245, information associated with the selected business object is displayed in a dynamic tab in the working area. FIG. 2 ends in step 250.

Figure 3A:
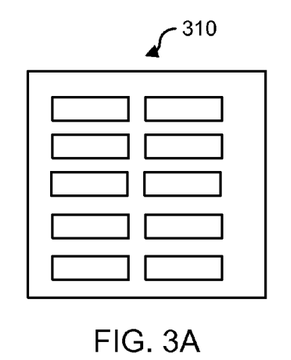
FIGS. 3A, 3B, and 3C are illustrations of different areas of a graphical user interface in one embodiment according to the present invention.
Figure 3B:
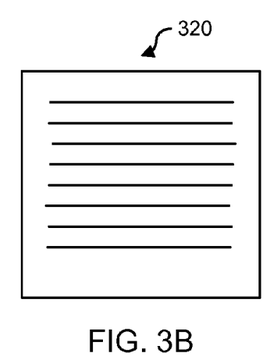
Figure 3C:
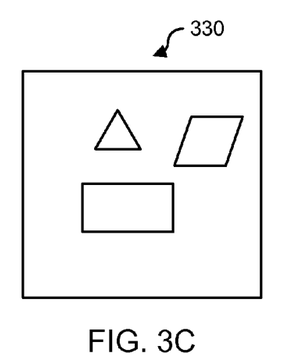

FIGS. 3A, 3B, and 3C are illustrations of different areas of a graphical user interface in one embodiment according to the present invention. FIG. 3A illustrates a page 310 that includes a plurality of user input fields for attributes associated with business objects. As discussed previously, typically applications suites provide search interfaces that contain entire or full pages with every or mostly every attribute for which a user can perform a search.

FIG. 3B illustrates a page 320 that includes a set of results associated with business objects. Typically, the results are displayed in a serial format, and may be displayed based on relevance or some other type of indicator. Once a user has provided data in the input fields of page 310, page 310 disappears and is replaced by page 320 displaying the set of results. Moreover, FIG. 3C illustrates a working area 330 with one or more business objects. Typically, the main working area (e.g., working area 330) of an application suite is generally separated from a search interface and a set of results display. As can be seen, each of the displays in FIGS. 3A, 3B, and 3C may be viewed or recognized as different modes in which a user interacts with the graphical user interface.

Figure 4:
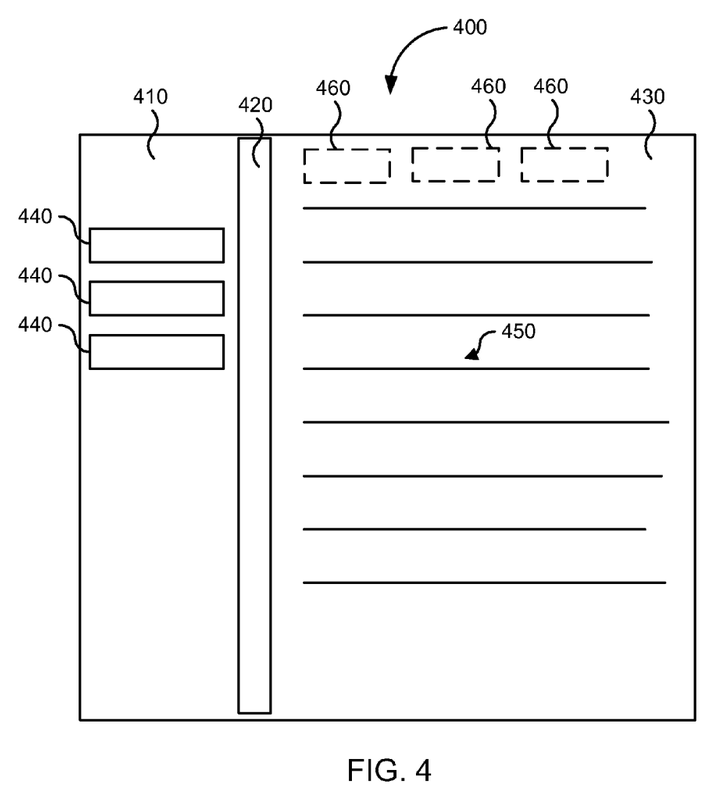
FIG. 4 is an illustration of one example of a graphical user interface with a compact search interface in one embodiment according to the present invention.

FIG. 4 is an illustration of one example of a graphical user interface 400 with a compact search interface 410 in one embodiment according to the present invention. In this example, graphical user interface 400 includes a compact search interface 410, a divider 420, and a working area 430. Compact search interface 410 includes a plurality of user input fields 440. Working area 430 includes an information area 450 and a plurality of dynamic tabs 460.

Compact search interface 410 is embedded in graphical user interface 400 to the left of working area 430, and separated from working area 430 in graphical user interface 400 by divider 420. Thus, a user interacting with information displayed in information area 450 can conveniently perform a search using compact search interface 410, without having to switch modes.

Compact search interface 410 displays user input fields 440 that may be the key search fields for a business object. For example, based upon knowledge of how most users or an average user of a particular application or applications suite performs searches, compact search interface 410 may be pre-configured to display only the key search fields for a particular business object. In some embodiments, Compact search interface 410 may be associated with a context that is dynamically generated based on the particular task or operations that the users performing while interacting with graphical user interface 400.

In some embodiments, the selection of search fields for the regional area 410 requires a prioritization. For example, follow the 80/20 rule, if a search field is only used 20% of the time, the search field is moved to an advanced search option accessible from compact search interface 410.

In various embodiments, upon entry (or login) to an application, a user is presented with contextual information about business objects in the larger working area 430 to the right of compact search interface 410. Accordingly, in some embodiment, graphical user interface 400 provides a sense that working area 430 is starting with search results automatically. This provides the user a greater sense of the business object without forcing user to execute a search.

Furthermore, search results may be displayed in one or more of dynamic tabs 460. For example, when a user selects one of dynamic tabs 460, information displayed in information area 450 may be again referenced by selecting one of dynamic tabs 460. Thus the user may switch back and forth between the user's previous work and search results with minimal interruption with the current task of the user.

Figure 5:
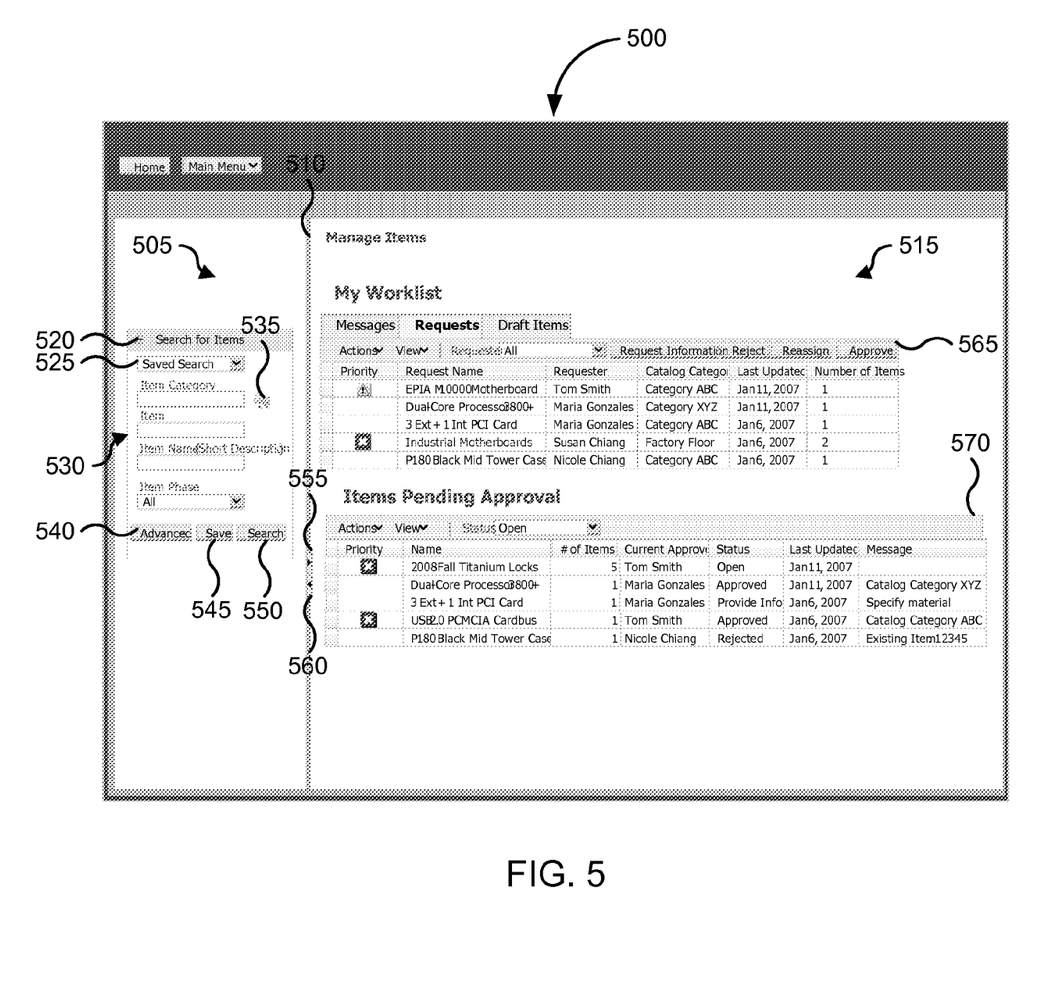
FIG. 5 is a screenshot of one example of a graphical user interface with a compact search interface before searching in one embodiment according to the present invention.

FIG. 5 is a screenshot of one example of a graphical user interface 500 with a compact search interface 505 before searching in one embodiment according to the present invention. In this example, graphical user-interface 500 includes compact search interface 505, a divider 510, and a working area 515. Compact search interface 505 includes a search dialog 520, a saved search list 525, a plurality of user input fields 530, an icon 535, an advanced search button 540, a save search button 545, and a search button 550. Divider 510 includes a right activation button 555 and a left activation button 560. Working area 515 includes a set of fixed tabs 565 and an information area 570.

As compact search interface 505 displays a reduced set of attributes for searching, in some embodiments, more or all of the attributes associated with a business object may be accessed for searching using advanced search button 540. In various embodiments, previously executed searches may be saved by clicking on save search button 545. Additionally, data entered into the plurality of user input fields 530 may be saved as a saved search with or without executing the actual search.

In various embodiments, search results are presented to the right of one or more search fields (e.g., user input fields 530) in a separate splitter pane. The search fields are presented in a compact rectangular splitter window pane (e.g., compact search interface 505), known as a regional area, and the results are presented to the right in a larger splitter pane (e.g., working area 515), known as a local area. The search interface in the regional area also allows for conditional searches for numbers, text, and other fields types, such as greater than or less than for numbers.

Figure 6:
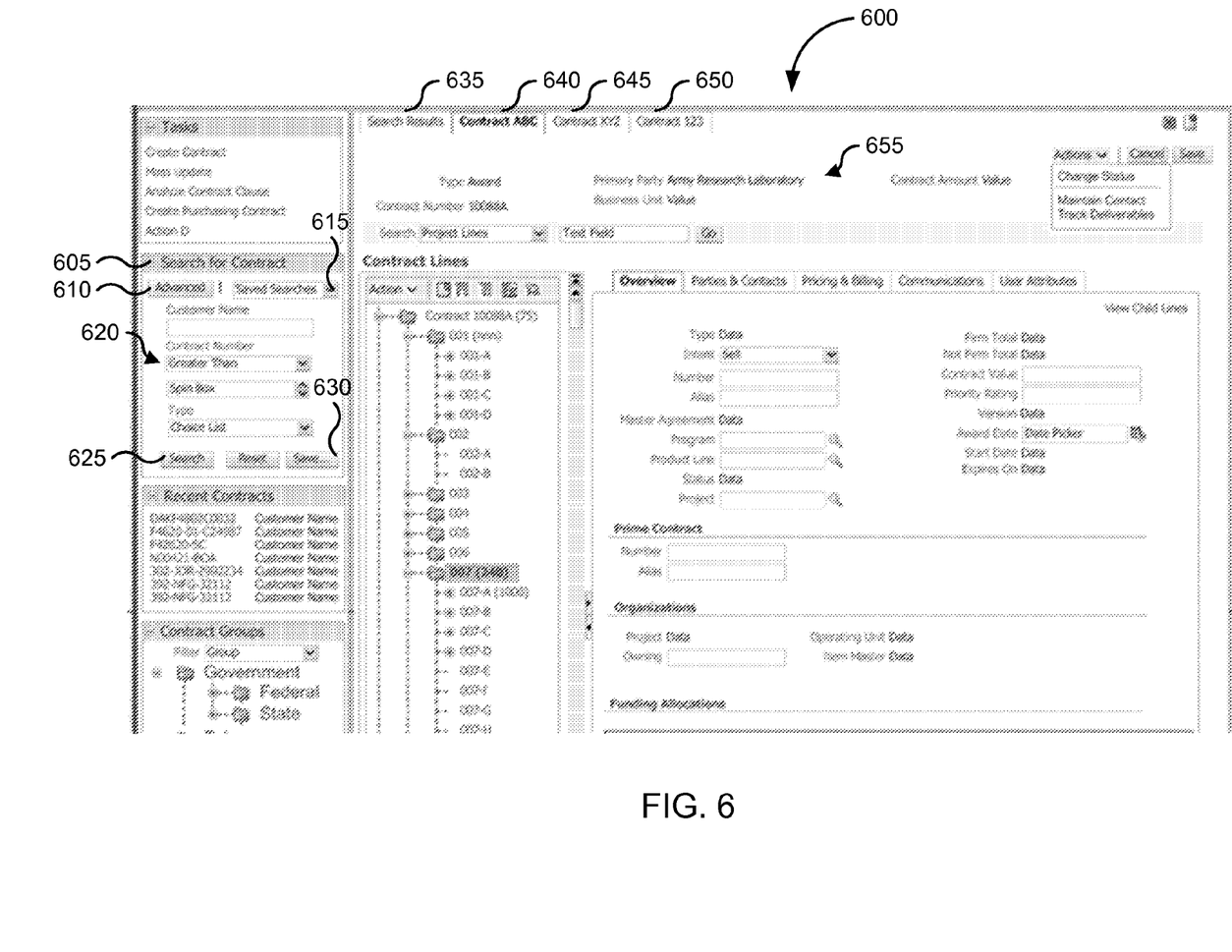
FIG. 6 is a screenshot of one example of a graphical user interface using dynamic tabs with a compact search interface after searching in one embodiment according to the present invention.

FIG. 6 is a screenshot of one example of a graphical user interface 600 using dynamic tabs with a compact search interface 605 after searching in one embodiment according to the present invention. Compact search interface 605 includes an advanced button 610, a saved search list 615, a plurality of user input fields 620, a search activation button 625, and a save search button 630.

In various embodiments, graphical user interface 600 reduces search criteria clutter by assuming most essential attributes to search from. In essence, graphical user interface 600 becomes aware of the specific task or activity a user is trying to accomplish, and reduces the extraneous search fields not required to perform a specific task or activity.

In some embodiments, graphical user interface 600 includes a plurality of dynamic tabs. In this example, graphical user interface 600 includes a search results tab 635, and business object tabs 640 (e.g., "Contract ABC"), 645 (e.g., "Contract XYZ"), and 650 (e.g., "Contract 123"). Header text or tab text (e.g., "Contract ABC") associated with business object tab 640 is bolded or highlighted to indicate that business object tab 640 is the current dynamic tab. Business object tab 640 includes an information area 655.

In some embodiments two types of search results are provided. The first type simply presents the results in the local area splitter window (e.g., information area 515). The second type provides that search results are presented in a dynamic tab within the local area (e.g., set of dynamic tabs 635, 640, 645, 650). When the dynamic tabbing option is chosen, a new tab is spawned when a user selects a search result object (e.g., "Contract ABC," "Contract XYZ," and "Contract 123"). For example, if the search results were purchase orders, clicking on purchase order "ABC" would result in two tabs: the first with search results and the second tab with details about purchase order ABC, such as contract or purchase order detail.

In this example, search results are received in response to a user's interaction with compact search interface 605 and are displayed in a dynamic tab (e.g., search results tab 635). When a user accesses a business object (purchase order, contract, etc.) from the search results, the selected business object may be opened in a new dynamic tab at the top of the page. The user can compare business objects' info or use as an aid to complete current task.

Thus, the user can search for a business object while completing a task without losing information from the current task. This type of search interface is less disruptive to the current task of the user because the user does not have to switch between search mode and working mode. In another example, when completing new contract information, a user can search and view other contracts in dynamic tabs without losing work entered.

Graphical user interface 600 allows an integrated search such that the user can concentrate on a task, search, and get results in a dynamic tab and not have to worry about losing information or dealing with changing mode, switching browser sessions, and the like. Additionally, there is a productivity benefit to having the omnipresent search, the user simply starts entering search criteria instead of having to navigate to a search interface. Moreover, conditional searches and saved searches are available and readably accessible to the user.

Figure 7:
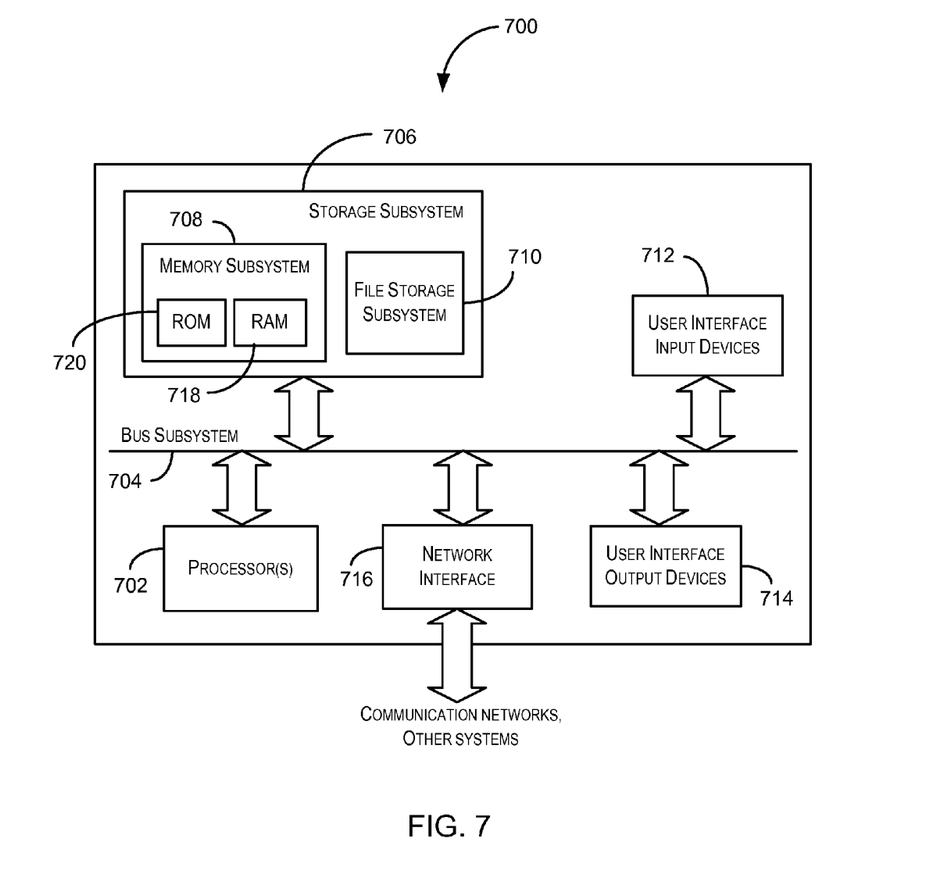
FIG. 7 is a simplified block diagram of a computer system that may be used to practice embodiments of the present invention.

FIG. 7 is a simplified block diagram of a computer system 700 that may be used to practice embodiments of the present invention. As shown in FIG. 7, computer system 700 includes a processor 702 that communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, and networks, and devices. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 may be configured to store the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
   displaying, with one or more processors associated with one or more computer systems, information about a first business object in a main working area of a graphical user interface, the first business object being one of a plurality of business objects having attributes stored as data in a database;
   displaying, with the one or more processors associated with one or more computer systems, a compact search interface within the main working area of the graphical user interface together with the information about the first business object where the compact search interface does not overlap the information about the first business object, the compact search interface having a plurality of input fields corresponding to a subset of attributes of business objects stored in the database, the subset of attributes determined based on a context associated with a user interacting with the main working area of the graphical user interface;
   receiving, at the one or more computer systems, one or more search terms provided via at least one of the input fields of the search interface;
   determining, with the one or more processors associated with the one or more computer systems, a set of search results by searching the database using a query plan constructed with at least the one or more search terms;
   displaying, with the one or more processors associated with the one or more computer systems, two or more search results from the set of search results;
   receiving, at the one or more computer systems, a selection of a second business object within the two or more search results; and
   in response to receiving the selection of the second business object within the two or more search results, generating and displaying, with the one or more processors associated with the one or more computer systems, a graphical representation of a second tab in the main working area of the graphical user interface together with a graphical representation of a first tab, the first tab providing information about the first business object in the main working area of the graphical user interface when the graphical representation of the first tab is selected, the second tab providing information about the second business object in the main working area of the graphical user interface when the graphical representation of the second tab is selected.

2. The method of claim 1 further comprising:
   receiving a selection of the graphical representation of the second tab; and
   switching in the main working area of the graphical user interface between the displayed two or more search results and the information about the second business object.

3. The method of claim 1 further comprising:
   generating a stored search based on the one or more search terms; and
   storing the stored search in the database.

4. The method of claim 3 further comprising:
   retrieving the stored search from the database in response to one or more user interactions made within the search interface; and
   executing a search based on the stored search.

5. The method of claim 1 further comprising:
   determining the context based on a task or type of task being performed by the user in the main working area.

6. A non-transitory computer-readable medium storing code executable by a processor of a computer system, the non-transitory computer-readable medium comprising:
   code for displaying information about a first business object in a main working area of a graphical user interface, the first business object being one of a plurality of business objects having attributes stored as data in a database;
   code for displaying a compact search interface within the main working area of the graphical user interface together with the information about the first business object where the compact search interface does not overlap the information about the first business object, the compact search interface having a plurality of input fields corresponding to a subset of attributes of business objects stored in the database, the subset of attributes determined based on a context associated with a user interacting with the main working area of the graphical user interface;
   code for receiving one or more search terms provided via at least one of the input fields of the search interface;
   code for determining a set of search results by searching the database using a query plan constructed with at least the one or more search terms;
   code for displaying two or more search results from the set of search results;
   code for receiving a selection of a second business object within the two or more search results; and
   code for generating and displaying, in response to receiving the selection of the second business object within the two or more search results, a graphical representation of a second tab in the main working area of the graphical user interface together with a graphical representation of a first tab, the first tab providing information about the first business object in the main working area of the graphical user interface when the graphical representation of the first tab is selected, the second tab providing information about the second business object in the main working area of the graphical user interface when the graphical representation of the second tab is selected.

7. The non-transitory computer-readable medium of claim 6 further comprising:
   code for receiving a selection of the graphical representation of the second tab; and
   code for switching in the main working area of the graphical user interface between the displayed two or more search results and the information about the second business object.

8. The non-transitory computer-readable medium of claim 6 further comprising:
   code for generating a stored search based on the one or more search terms; and
   code for storing the stored search in the database.

9. The non-transitory computer-readable medium of claim 6 further comprising:
   code for retrieving the stored search from the database in response to one or more user interactions made with the search interface; and
   code for executing a search based on the stored search.

10. The non-transitory computer-readable medium of claim 6 further comprising:

code for determining the context based on a task or type of task being performed by the user in the main working area.

11. A system comprising:
a processor; and
a memory storing a set of instructions which when executed by the processor configured the processor to:
display information about a first business object in a graphical representation of a first tab in a main working area of a graphical user interface, the first business object being one of a plurality of business objects having attributes stored as data in a database;
display a compact search interface within the main working of the graphical user interface together with the information about the first business object where the compact search interface does not overlap the information about the first business object, the compact search interface having a plurality of input fields corresponding to a subset of attributes of business objects stored in the database, the subset of attributes determined based on a context associated with a user interacting with the main working area of the graphical user interface;
receive one or more search terms provided via at least one of the input fields of the search interface;
determine a set of search results by searching the database using a query plan constructed with at least the one or more search terms;
display two or more search results from the set of search results;
receive a selection of a second business object within the two or more search results; and
in response to receiving the selection of the second business object within the two or more search results, display a graphical representation of a second tab in the main working area of the graphical user interface together with a graphical representation of a first tab, the first tab providing information about the first business object in the main working area of the graphical user interface when the graphical representation of the first tab is selected, the second tab providing information about the second business object in the main working area of the graphical user interface when the graphical representation of the second tab is selected.

12. The system of claim 11 wherein the processor is further configured to:
receive a selection of the graphical representation of the second tab; and
switch in the main working area of the graphical user interface between the displayed two or more search results and the information about the second business object.

13. The system of claim 11 wherein the processor is further configured to:
generate a stored search based on the one or more search terms; and
store the stored search in the database.

14. The system of claim 13 wherein the processor is further configured to:
retrieve the stored search from the database in response to one or more user interactions made with the search interface; and
execute a search based on the stored search.

15. The system of claim 11 wherein the processor is further configured to:
determine the context based on a task or type of task being performed by the user in the main working area.

* * * * *